United States Patent [19]
Östberg

[11] 4,416,312
[45] Nov. 22, 1983

[54] GUIDING MECHANISM FOR TIMBER CUTTING MACHINES

[75] Inventor: Sven E. Östberg, Söderhamn, Sweden

[73] Assignee: Kockums Industri A.B., Soderhamn, Sweden

[21] Appl. No.: 276,960

[22] Filed: Jun. 24, 1981

[30] Foreign Application Priority Data

Jul. 3, 1980 [SE] Sweden ............................... 8004919

[51] Int. Cl.³ ...................... B27C 9/00; B27C 1/08; B27B 15/08; B27M 1/00
[52] U.S. Cl. ...................................... 144/39; 144/41; 144/376; 144/378; 83/404.1; 83/404.4; 83/425.2; 83/102.1
[58] Field of Search .......... 83/404.1, 404.4, 425.425.2, 83/102.1, 449; 144/39, 41, 376, 378

[56] References Cited

U.S. PATENT DOCUMENTS 2,684,088  7/1954  Miller ................................. 83/404.4
3,692,074  9/1972  Nilsson ................................... 144/39
3,742,796  7/1973  McMillan ......................... 83/102.1
3,903,771  9/1975  Fritz et al. ......................... 83/102.1

Primary Examiner—Donald R. Schran
Attorney, Agent, or Firm—Seed and Berry

[57] ABSTRACT

A cutting machine fitted with saw blades for pieces of timber has, adjacent to at least one pair of outer saw blades, lateral guide devices, the position of which can be adjusted, and which ensure the guiding of a worked piece of timber when its rear end section has left the lateral guide devices before the saw blades on the feed side of the arrangement. The arrangement is suitable for simple sawing machines and for reducing and reducing-sawing machines, and is particularly advantageous for the working of curved timber.

9 Claims, 3 Drawing Figures

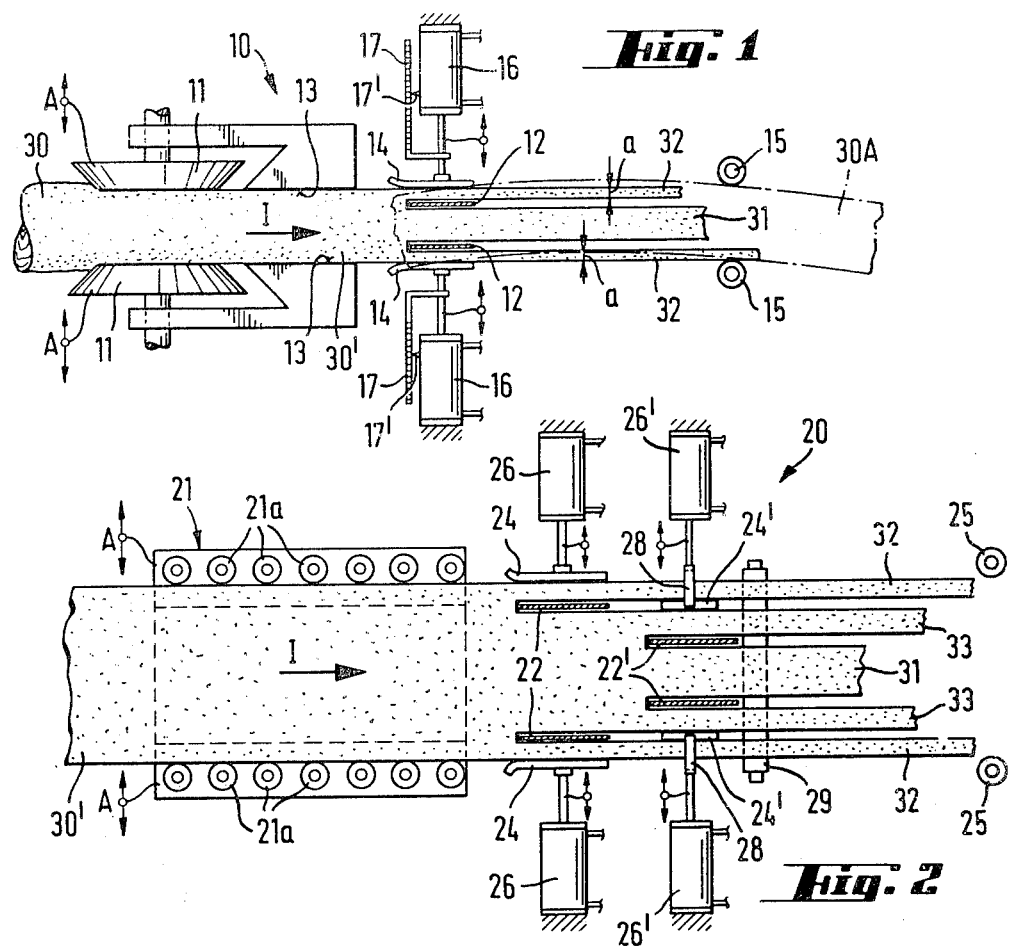
Fig. 1
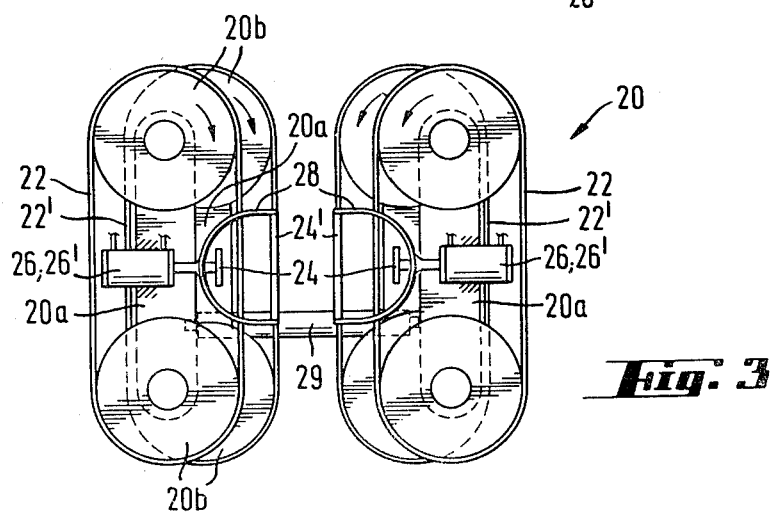
Fig. 2
Fig. 3

GUIDING MECHANISM FOR TIMBER CUTTING MACHINES

TECHNICAL FIELD

The invention relates to a guiding arrangement on timber cutting machines fitted with saw blades, of the sawing machines or reducing saw type.

BACKGROUND ART

It is a known technique to arrange, on the entry or feed side of a cutting machine, in front of the front saw blades, lateral guiding devices which carry the as yet uncut piece of timber towards the saw teeth in the required position. An example of a cutting machine adapted for use with the inventive guiding mechanism is described in U.S. Pat. No. 3,692,074. These guiding devices may, for example, be made up of a guide mechanism which comprises a numer of pairs of rollers arranged behind each other in the direction of feeding of the piece of timber. The spacing between the rollers is adjustable, and is increased to receive each new piece of timber. The distance is then reduced so that the piece of timber is firmly enclosed by the rollers on both sides. In the case of a reducing saw, the lateral guiding devices are formed partly by the reducing discs themselves, and partly by flat guide plates adjacent to the reducing discs. Here too, the distance between the lateral guiding devices at right angles to the direction of feeding is controllable.

When the rear end section of the piece of timber, usually the root end section, has left these guiding devices arranged in front of the saw blades, the piece of timber is no longer laterally guided. Only at a certain distance after the saw blades are there lateral guide rollers arranged on the output side. Thus the piece of timber is not laterally guided at all at the place where it is being cut. Problems arise when the rear end face of the piece of timber has passed the last lateral support on the feed side. Although the distance to be covered to the saw teeth is relatively short (of the order of 50 mm), the rear end section of a curved piece of timber may nevertheless have an adverse effect on the saw blade or blades, such as by applying a lateral twist to the blade or blades. This effect results because the cut front section of the piece of timber being fed out of the machine is laterally gripped in the guide rollers on the output side, which, depending the extent to which the piece of timber has a curved plan profile shape, means that, when all support on the feed side has ceased, a torque is produced with its centre of rotation at the sawing point, i.e. acting directly on the saw blades. In sawing machines with more than two saw blades arranged at two different distances from the feed end, the distance to the more remote saw blades is even greater, and the torque acts on these saw blades for an even longer time.

The pieces of timber are fed into the above described cutting machines continuously, one after the other. The distance between the rear end face of one piece of timber and the front end face of the next piece of timber is known as the "log gap". When the log gap is shorter than the length of the guide mechanism (the shorter the log gap, the more economical the process), the guide mechanism must be open to receive the next piece of timber even before the preceding piece of timber has completely left the guide mechanism, which means that approximately 300 or 600-700 mm (with respect to the more remote saw blades) of the end section of the piece of timber is unguided. In the quality control of sawn timber, the thickness is customarily measured within, among others, the first "module" (3 dm) from each end face, meaning that one of these quality control measurements is taken within the above-mentioned rear end section of 300–700 mm which is unguided.

DISCLOSURE OF THE INVENTION

An object of the present invention is to eliminate or at least considerably reduce the adverse effects on a saw blade caused by the rear end of a piece of timber as it leaves an infeed guiding device.

Another object of the invention is to minimize the length of the log gap in order to maximize the efficiency of a cutting machine.

These and other objects of the invention are provided by a pair of guiding devices contacting opposite faces of a piece of timber adjacent a saw blade of the cutting machine. The guiding devices are selectively movable away from each other to accommodate a piece of timber as its front end reaches the blade. A member of such guiding devices may be used for multi-blade cutting machines by positioning a pair of guiding devices adjacent each set of axially mounted blades.

BRIEF DESCRIPTION OF THE DRAWINGS

FIG. 1 is a top plan view of one embodiment of the guiding mechanism.

FIG. 2 is a top plan view of an embodiment of the guiding mechanism adapted for use with cuting machines having multiple sets of blades.

FIG. 3 is an elevational view taken along the timber feed path showing the guiding mechanism mounted on a pair of conventional band saws.

BEST MODE FOR CARRYING OUT THE INVENTION

According to FIG. 1, a reduding saw 10 comprises a pair of rotatable reducing discs 11 arranged opposite each other, between which a log 30 is worked by simple reducing to a block 30'. The block 30' is then cut by two saw blades 12 to give a central piece 31 and two outer boards 32. Arranged in the feed direction I after reducing discs 11 there are lateral guides 13 in the form of flat surfaces. The reducing discs 11 and the lateral guides 13 can be adjusted in the directions of arrow A to different distances apart to produce blocks of different widths.

Behind saw blades 12, on the output side of the machine, rear lateral guide rollers 15 are arranged. Chain-dotted lines show the shape assumed by a curved piece of timber 30A when its rear end passes beyond the lateral guides 13. It is apparent that the timber 30A will apply a lateral torque to the saw blades 12 since the curvature of the timber 30A causes the kerfs of the blades 12 to rotate so that they are no longer perpendicular to the rotational axis of the blades 12. As a result, the timber 30A is inaccurately sawed at its end. The cutting machine and guide mechanism described so far are conventionally used.

According to the invention, there is arranged adjacent to each outer saw blade 12 a further lateral guide 14, in the example shown also in the form of flat surface. The positions of these lateral guides can be adjusted independently of the settings of lateral guides 13, owing to the fact that they are each mounted on a double-acting cylinder-piston assembly 16. The cylinder-piston assemblies 16 are arranged to act simultaneously as position transmitters, and measuring probes 17, which interact with indices 17' arranged on the cylinder bodies of the assemblies, can be rigidly connected to their piston rods. The adjustment is made as a function of the thickness A of the outer boards 32, which in normal cases may be, for example, 16, 19 or 25 mm.

According to FIG. 2 a band saw 20 comprises a first front set of peripheral saw blades 22 and a second rear set of central saw blades 22'. On the feed side a guide mechanism 21 is arranged with seven pairs of guide rollers 21A, the distance apart of which, perpendicular to the feed direction I, can be adjusted in the direction of arrow A. To receive each new piece of timber, they must always be set to the greatest distance apart. A block 30' fed through guide mechanism 21 is cut into a central piece 21, two outer boards 22 and two inner boards 33. On the output side 31 there are lateral guide rollers 25 and several transport rollers such as 29. So far the arrangement is conventional.

According to the invention there is also arranged adjacent to each outer saw blade 22 in the first front set of saw blades, a further lateral guide 24, and adjacent to each outer saw blade 22' in the second set a lateral guide 24'. All the lateral guides, 24, 24' are mounted on cylinder-piston assemblies 26, 26' in a manner analoguous to that shown in FIG. 1. Lateral guides 22' are supported by yokes 28 (FIG. 3) which can clear the outer boards 32. It is evident that, instead of the yokes 28, hook devices may be used which clear the outer boards from above or below only.

FIG. 3 shows that the cylinder-piston 26, 26' may with advantage be mounted on the frame 20a of a conventional band saw 20 in the free space between the two blade pulleys of the machine, so that the external dimensions of the arrangement are not increased.

Consideration of FIG. 2 shows that, without the extra guides according to the present invention, the inner boards 33 and the central piece 30, which are the most valuable parts of a cut piece of timber, receive the worst guiding, leading to the lowest dimensional accuracy. Although in the examples shown the additional lateral guide devices are shown to have the form of flat surfaces, it is evident that they can also have another form, for examples the form of vertical rollers similar to rollers 21a in mechanism 21.

I claim:

1. In a guide mechanism for timber cutting machines having a saw blade acting along a cutting axis in which a piece of timber is fed, a lateral infeed guide fixing the position of said piece of timber in a lateral direction substantially perpendicular to said cutting axis before said piece of timber reaches said saw blade, a lateral outfeed guide fixing the position of said piece of timber in a direction substantially perpendicular to said cutting axis after said piece of timber has been cut by said saw blade, the improvement comprising a timber guide positioned laterally adjacent said saw blade and operable independent of said infeed guide for fixing the position of said piece of timber in a direction substantially perpendicular to said cutting axis as said piece of timber is being cut in order to prevent said piece of timber from applying a lateral torque to said saw blade, said timber guide being laterally adjustable independent of said infeed guide, whereby said timber guide continues fixing the position of said piece of timber as it is being cut and as said infeed guide is being adjusted to accept another piece of timber to minimize the log gap between said pieces of timber.

2. The guide mechanism of claim 1 wherein said timber guide includes a pair of lateral guide surfaces spaced apart on opposite sides of said cutting axis, and actuating means for selectively moving said guide surfaces apart from each other to receive the front end of said piece of timber, and, for then, forcing said guide surfaces against opposite sides of said piece of timber.

3. The guide mechanism of claim 2 wherein said actuating means comprises a pair of hydraulically controlled rams acting substantially perpendicularly to said cutting axis, said rams having actuating rods connected to said respective guide surfaces.

4. The guide mechanism of claim 3 wherein said rams provide an indication of the spacing between said guide surfaces.

5. The guide mechanism of claim 1 wherein said cutting machine includes a second saw blade acting along a second cutting axis substantially parallel to and laterally offset from said first cutting axis, said second saw blade being spaced apart from said first saw blade along said second cutting axis toward said outfeed guide, and wherein said guide mechanism further includes a second timber guide positioned laterally adjacent said second saw blade and operable independent of said infeed guide for fixing the position of said piece of timber in a direction substantially perpendicular to said second cutting axis as said piece of timber is being cut by said second blade in order to prevent said piece of timber from applying a lateral torque to said second saw blade, said second timber guide being laterally adjustable independent of said infeed guide.

6. The guide mechanism of claim 5 wherein said second timber guide includes a second pair of lateral guide surfaces spaced apart from each other on opposite sides of said second cutting axis, at least one of said guide surfaces being positioned in a kerf formed by said first saw blade.

7. A machine for cutting a succession of logs, said machine comprising:
adjustable cutting means for cutting the oppositely disposed side portions of a log to produce an elongated block having substantially parallel, planar lateral surfaces, said cutting means being adjustable for cutting each successive log to a block having a preselected lateral separation between said lateral block surfaces;
sawing means for longitudinally cutting at least one board from said block, said sawing means being spaced from said cutting means in the direction of feed of said block;
infeed guide means positioned between said cutting means and said sawing means to engage said lateral block surfaces for fixing the lateral position of said block prior to said block reaching said sawing means, said infeed guide means being adjustable for engaging said lateral block surfaces of said block being cut by said cutting means; and
guide means positioned laterally adjacent said sawing means and operable independent of said infeed guide means to engage said lateral block surfaces of said block being cut by said sawing means for fixing the lateral position of said block while being cut in order to prevent said block from applying a lateral torque to said sawing means, said guide means being adjustable for engaging said lateral block surfaces of said block being cut by said sawing means independent of the adjustment of said infeed guide means.

8. The machine of claim 7, further including second sawing means for longitudinally cutting at least one additional board from said block, said second sawing means being spaced from said first sawing means laterally and longitudinally in the direction of feed of said block, and including second guide means positioned laterally adjacent said second sawing means and operable independent of said infeed guide means to engage said lateral block surfaces of said block being cut by said second sawing means for fixing the lateral position of said block while being cut in order to prevent said block from applying a lateral torque to said second sawing means, said second guide means being adjustable for engaging said lateral block surfaces of said block being cut by said second sawing means independent of the adjustment of said infeed guide means.

9. A guide mechanism for timber cutting machines having a pair of band saws, each having a continuous saw band entrained on pulleys which are interconnected by a rigid frame, said band saws being positioned opposite each other, with their respective cutting axis along which a piece of timber is fed substantially parallel to each other and their pulleys positioned laterally away from each other, a pair of opposing lateral infeed guides fixing the position therebetween of said piece of timber in a lateral direction substantially perpendicular to said cutting axes before said piece of timber reaches said band saws, a pair of opposing lateral outfeed guides fixing the position therebetween of said piece of timber in a direction substantially perpendicular to said cutting axes after said piece of timber has been cut by said band saws, and a pair of lateral timber guides positioned laterally adjacent said band saws and operable independent of said infeed guides for fixing the position of said piece of timber in a direction substantially perpendicular to said cutting axes as said piece of timber is being cut in order to prevent said piece of timber from applying a lateral torque to said band saws, each of said lateral guides being mounted on one of said frames of said band saws between respective pulleys, said lateral guides being laterally adjustable independent of said infeed guides, whereby said lateral guides continue fixing the position of said piece of timber as it is being cut and as said infeed guides are being adjusted to accept another piece of timber to minimize the log gap between said pieces of timber.

10. The guide mechanism of claim 9 wherein said lateral timber guides include hydraulic rams mounted on the frames of respective band saws, said rams including respective actuating rods extending toward each other, said lateral timber guides further including respective guide surfaces mounted on said rods for contacting opposite surfaces of said piece of timber.

* * * * *